United States Patent
Theodorson

[15] 3,660,216
[45] May 2, 1972

[54] SEMI-RIGID PANELING

[72] Inventor: Jerald W. Theodorson, Oak Park Heights, Minn.

[73] Assignee: Minnesota Mining and Manufacturing Company, Saint Paul, Minn.

[22] Filed: Aug. 20, 1969

[21] Appl. No.: 851,653

[52] U.S. Cl..............................161/161, 161/162, 161/165, 161/168, 161/181, 161/190, 161/213, 161/214, 161/231
[51] Int. Cl.....................B32b 3/26, B32b 5/18, B32b 27/40
[58] Field of Search..................161/190, 159, 160, 161, 162, 161/168, DIG. 5, 165, 181, 219, 231

[56] References Cited

UNITED STATES PATENTS

| | | | |
|---|---|---|---|
| 2,806,509 | 9/1957 | Bozzacco et al. | 161/162 X |
| 2,999,041 | 9/1961 | Lappala | 161/190 |
| 3,238,156 | 3/1966 | Kohrn | 260/2.5 |
| 3,316,139 | 4/1967 | Alford et al. | 161/162 X |
| 3,510,392 | 5/1970 | d'Eustachio et al. | 161/162 |

Primary Examiner—John T. Goolkasian
Assistant Examiner—C. B. Cosby
Attorney—Kinney, Alexander, Sell, Steldt & Delahunt

[57] ABSTRACT

A laminate preferably consisting of a 25–250 mil-thick sandwich having a microsphere-filled elastomeric core (derived from a hollow, particulate filler and an elastomer such as polyurethane with a stress at 100 percent elongation of 500–4,000 psi) and two 1–10 mil high tensile-strength (stress at 2 percent elongation above 10,000 psi) skins provides a paneling material with, for example, good corrosion and impact resistance. The hollow, particulate filler loading is 20–65 volume percent of the core; and the flexural composite modulus of the sandwich-type laminate is in the range of $0.5$–$4 \times 10^5$ psi; and the density can range from about 0.5 to about 1.0 g./cm³. These laminates have a wide variety of constructional, decorative, and insulative uses. Somewhat stiffer and thicker laminates can be provided by using more than one core alternating with a plurality of skins.

14 Claims, 3 Drawing Figures

PATENTED MAY 2 1972
3,660,216
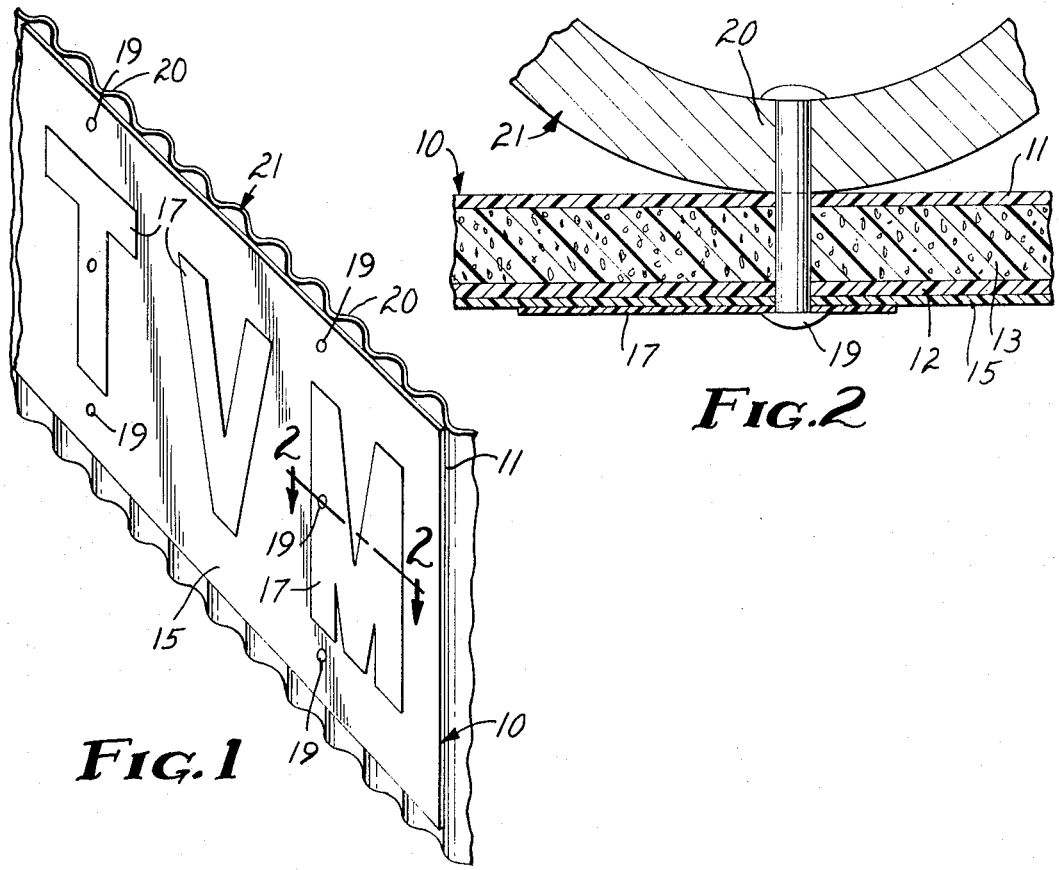
Fig.1
Fig.2
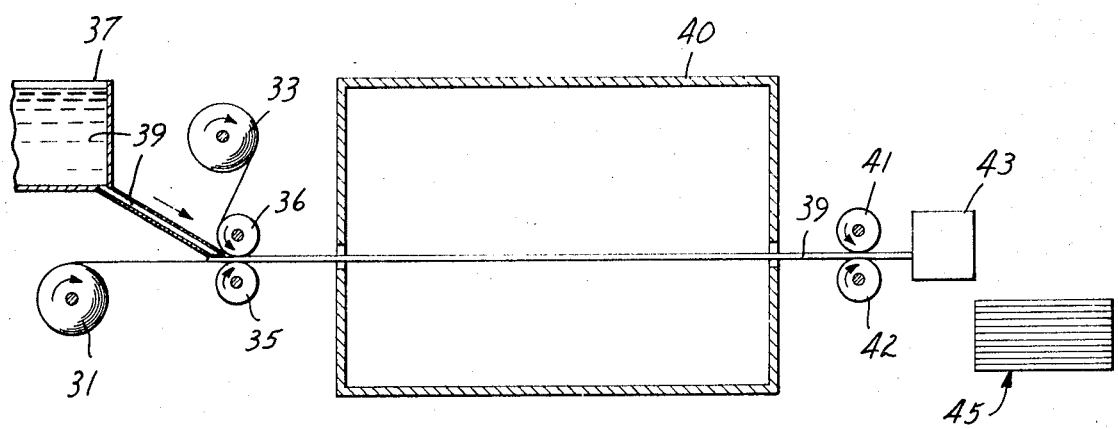
Fig.3
INVENTOR.
JERALD W. THEODORSON
BY Kinney, Alexander,
Sell, Steldt & DeLaHunt
ATTORNEYS

SEMI-RIGID PANELING

FIELD OF THE INVENTION

This invention relates to a semi-rigid sheeting product suitable for use as a structural material, e. g. as paneling. More particularly, this invention relates to a laminated product comprising a microsphere filled elastomeric core combined with strong, durable skins. The laminate of this invention is particularly suitable in applications wherein some degree of rigidity is required, the rigidity being gained without sacrificing weather resistance, corrosion resistance, impact resistance, or the like, and without unduly increasing the cost or density of the final product. This invention is particularly useful for providing a material that can serve as a sign backing for the trucking and container industries.

DESCRIPTION OF THE PRIOR ART

Many types of structural and/or decorative paneling are commonly used to bridge a framework to provide a smooth, flat or smooth, curved surface. For example, plywood veneer is used in home construction; aluminum is used for aircraft skins; and synthetic resins and synthetic resin-coated metals are commonly used for sign backings, particularly for sign backings mounted on trucks. It is highly desirable that paneling of this nature be highly resistant to buckling when bent, highly resistant to shattering when subjected to impacts, corrosion and weather resistant, and very light in weight.

Wood veneers are not as weather resistant as might be desired; when exposed to the elements, many wood veneers splinter and warp. Furthermore, wood is light but must be used in thick sections to provide the strength required to bridge the studs of a framework. Aluminum corrodes, especially if exposed to salt spray-containing environments, e. g. in coastal areas. Synthetic resin materials may or may not be weather resistant. Generally speaking, they are subject to undesirable changes in properties resulting from temperature extremes, e. g. they become unduly brittle at low temperatures and have a tendency to shatter on impact even if reinforced.

It has been found that certain polyester resins have good strength and weather resistant characteristics. See, for example, U.S. Pat. No. 3,309,804 (Gill), issued Mar. 21, 1967, wherein a weather resistant polyester film is used to protect an outdoor sign. In making printed cover stock material out of cardboard, it has also been found useful to coat the cardboard with a layer of clear "Mylar" plastic (a tradename for biaxially oriented poly[ethylene terephthalate]), 2 mils (0.05 mm.) in thickness; see U.S. Pat. No. 3,099,947, issued Aug. 6, 1963. Unfortunately, it is technically very difficult and economically impractical to make panels of sufficient thickness solely of weather resistant polyester such as oriented poly(ethylene terephthalate) on a commercial scale if the thickness is greater than about 20 mils (or about 0.5 mm.).

One possible solution to the thickness problem would be to make a laminate, more particularly a sandwich structure, which has the same or nearly the same properties as solid poly(ethylene terephthalate), but which is thicker than 20 mils and which lend itself to inexpensive mass production techniques. Such a laminate would comprise polyester skins and a relatively inexpensive core material derived, for example, from a liquid resinous material such that it could be of any desired thickness, this material being curable to a solid.

Making a laminate of this nature raises several new problems. First, the core material is unlikely to possess the highly desirable properties of the oriented polyester films, i. e. resistance to temperature extremes, weather, shattering on impact, buckling upon bending, etc. Second, the combined weight of the polyester skins and the core material, particularly when the thickness of the composite (the sandwich-like laminate) is greater than about 25 mils, is likely to be undesirably great, particularly for uses such as sign backings. Heavy plastic signs or metal signs, if torn from their mountings present a serious hazard due to their great weight. In short, the same problem would be encountered with the laminate that is encountered with wood veneers; sufficient structural strength is obtained only by an unacceptable weight gain.

Two methods of reducing weight have been proposed: one involves foaming the core material; the other involves the use of a light weight filler. Foaming is taught in U.S. Pat. Nos. 2,376,653 (Boyer), issued May 22, 1945, 2,908,602 (Collardeau et al.), issued Oct. 13, 1959, 3,158,529 (Robitschek et al.), issued Nov. 24, 1964, and 3,256,131 (Koch et al.), issued June 14, 1966. Although a low density laminate can be obtained in accordance with these prior art teachings (and can be obtained by continuous methods according to Koch et al. and Robitschek et al.), the strength characteristics of the resulting composite can be a serious problem. A foamed elastomeric core, e. g. foamed polyurethane, has very little resistance to buckling, because the elastomer is highly flexible and has insufficient stiffness or strength for most structural applications. For example, Koch et al. teach that a backing such as a sheet of plywood is needed to provide the laminate with rigidity. Other means of providing strength and/or rigidity are: the use of glass fiber reinforcement (Collardeau et al.) and the use of reinforcing fillers or non-elastomeric, thermoset foams (Boyer).

The latter methods of increasing strength have drawbacks. First, the use of continuous laminating processes is rendered more difficult or even impossible. Second, the weight gain is increased, and the advantages of foaming are lost, at least in part. Third, even reinforcing fillers or fibers often do not reduce the tendency of a foam to buckle when bent.

The second method of reducing the weight of the laminate involves the use of tiny, hollow spheres of glass or plastic. U.S. Pat. Nos. 2,806,509 (Bozzacco et al.), issued Sept. 17, 1957, and 3,316,139 (Alford et al.), issued Apr. 25, 1967 suggest batch processes for making sandwich structures with a high strength-to-weight ratio from glass bubble-filled core material and two or more skins. Neither Alford et al. nor Bozzacco et al. contemplate the use of polymeric films or sheet metal for the skins of a sandwich-like laminate. For this purpose, Bozzacco et al. and Alford et al. prefer fibrous sheets (e. g. of resin-impregnated fiberglass), the fibers having a reinforcing effect, and most of the strength of the resulting laminate appears to inhere in the reinforcing layers. This can be seen from the fact that Alford et al. contemplate (see Table VI) core materials consisting of matrices loaded with more than 65 percent by volume of glass bubbles. It follows from purely geometric considerations that such highly loaded cores must contain voids and/or contiguous spheres, the presence of which can reduce the impact resistance and flexural strength of the core layer. Furthermore, these skins are heavy and thick, being laminated structures in and of themselves, and thus are not at all like thin films of, for example, oriented polyester. Polymeric films, sheet metal, etc. are much easier to handle, from a manufacturing standpoint, than resin-impregnated fiberglass layers; i. e. they make the laminate easier to fabricate and to cut to size.

Accordingly, this invention contemplates a strong semi-rigid paneling laminated from materials which are easy to use from a manufacturing standpoint.

This invention also contemplates a laminate which can be far thicker than available oriented polyester films, can possess certain highly desirable physical properties, including resistance to corrosion, weathering, buckling, shattering (even at low temperatures), and the like, but which can be light in weight due to the presence of a low density filler in a core layer of the laminate.

This invention also contemplates a laminate which is useful as a substitute for known sheet materials or laminates (including, for example, plywood or aluminum honeycomb structures) which serve as rigid or semi-rigid paneling.

This invention also contemplates a light-weight laminate useful as a sign backing, particularly a sign backing which must bridge support members spaced 12–36 inches (30–90 cm.), preferably at least 24 inches (60 cm.), apart.

This invention further contemplates a laminate which can be fabricated by continuous, high production techniques, and which can be cut to size without special cutting equipment.

It is still further contemplated that the strength of the laminate thus produced, particularly the impact resistance, is not substantially affected by high loading of a low density filler such as glass microspheres.

SUMMARY OF THE INVENTION

I have found that a semi-rigid sheeting product with excellent resistance to corrosion, weathering, shattering upon impact (even at low temperatures), buckling due to bending, and the like, can be simply and economically produced from thin, i. e. 1-10 mil or about 0.025-0.25 mm. strong, durable skins, preferably of a synthetic polymer such as an oriented polyester and an elastomeric core containing a low density filler such as glass microspheres; provided, that the skins and the core material are selected such that the flexural modulus of a sheet laminated from the skins and the filled core is in the range of $0.5-4 \times 10^5$ psi ($0.3-3 \times 10^{10}$ dynes/cm.$^2$) as determined at room temperature by a Bruel-Kjaer type 3930 complex modulus apparatus or an equivalent device. The preferred form of the composite sheet, i. e. the laminate, is a skin/core/skin sandwich. The thickness of the composite can be considerably greater than available oriented polyester films and can range from about 25 to about 250 mils (about 0.6-6 mm.). The density of the resulting sandwich composite is quite low, the approximate range being from 0.5 g./cc. to 1.0 g./cc. The loading of microspheres in the core can vary considerably without affecting the overall properties of the composite. Generally speaking, unless at least 20 volume percent of the core material is the low density filler, the saving in weight is not too significant. The loading should not exceed 65 percent by volume, lest microsphere-to-microsphere contact or voids be produced in the core material, thus interfering with the desirable structural properties of a microsphere-filled matrix. I have also found that non-cellular urethane elastomers, i. e. rubbery polyurethanes or polyurethane-polyureas capable of elongation without permanent loss of their original shape, are particularly suitable for use in the core. Such elastomers have a stress of 500-4,000 psi (35-280 kg./cm.$^2$) at 100 percent elongation. I have found that the highly desirable impact resistance properties of the laminates of this invention are, at least in part, traceable to the elastomeric nature of the core. The core flexibility enables the composite to resist shattering upon impact, provided the composite modulus is not substantially in excess of $4 \times 10^5$ psi (about $3 \times 10^{10}$ dynes/cm.$^2$). Furthermore, I have found that the non-cellular urethane core material does not adversely affect the ability of the composite structure to effectively bridge posts or other support members (including corrugations on a corrugated surface) spaced up to 90 cm. apart and to resist buckling when bent at a sharp angle, provided the composite modulus is not substantially less than $5 \times 10^4$ psi (about $0.3 \times 10^{10}$ dynes/cm.$^2$).

It is a surprising feature of this invention that 20-65 volume percent of glass microspheres can be present in the core without substantially affecting the flexural modulus of the composite. It would be expected that high loading of glass microspheres would increase the stiffness of the composite and result in sharply reduced impact resistance. For reasons which are not entirely clear, however, the flexural or elastic modulus remains surprisingly constant over the entire range of microsphere loadings contemplated herein, i. e. 20-65 volume percent.

The invention can be more clearly understood by referring to the accompanying drawings wherein:

FIG. 1 is a perspective view of a sign member made according to this invention and mounted on supporting members spaced 2 feet apart, FIG. 2 is a cross sectional view, greatly enlarged, taken along line 2—2 of FIG. 1, and FIG. 3 is a schematic diagram illustrating a continuous method for making laminates according to this invention.

DETAILED DESCRIPTION AND EXAMPLES

Turning now to the drawings, FIGS. 1 and 2 illustrate a sheet-like sign member 10 mounted on a corrugated surface 21 (e. g. of a truck body), the particular corrugations 20 selected for mounting being spaced about 2 feet (60 cm.) apart. The sign member 10 is fastened to the corrugations 20 by any suitable means, in this case rivets 19. (If surface 21 were flat instead of corrugated, exterior posts could be used to receive the rivets 19.) The laminar structure of the sheet material from which the sign member 10 is made is shown in FIG. 2 and includes two synthetic resin (e. g. polyester) skins 11 and 12, a glass microsphere-filled elastomeric core 13, a suitable decorative surface (e. g. a pigment-filled resin) 15, and indicia such as letters 17 (also shown in FIG. 1), the letters 17 or indicia being the information, advertising, or the like displayed against the decorative surface background 15. For convenience of illustration, the core/skin thickness ratio shown in FIG. 2 is about 16:3, but it would normally be much larger, e. g. 15:1. The indicia 17 are shown as a superposed discontinuous layer coated or printed onto the decorative surface 15, but it is possible to use the skin 11/core 13/ skin 12 sandwich with or without decorative surface 15 as a sign backing, upon which backing a thin sheet-like material containing indicia can be secured.

FIG. 3 schematically illustrates a preferred method for continuously laminating and curing a semi-rigid paneling material, such as the skin 11/core 13/ skin 12 material shown in FIG. 2, from two polymeric films and a curable filled-resin core material. In this method, synthetic polymeric (e. g. polyester) film is wound up in the form of two large film stock rolls 31 and 33 which are continuously unwound in the direction shown by the curved arrows and passed over top and bottom orificing rolls 35 and 36 to provide two parallel sheets of film. The two parallel sheets define a space which is continuously filled with curable core-forming material 39, e. g. a liquid polyurethane-forming material loaded with 20-65 volume percent glass microspheres. The core-forming material is supplied from mixing and metering equipment 37 and continuously flows in the direction shown by the straight arrow into the space defined by the parallel films. An optional, but preferred, step (not shown) is the etching or priming of the films supplied from the film stock rolls 31 and 33. Another optional, but preferred, step (also not shown) is the coating of one of the films with a decorative material, e. g. a pigmented resin. The composite continuously emerging from the orificing rolls 35 and 36 passes into an oven 40 wherein the core-forming material 39 is at least partially cured. The composite emerging from the oven 40 passes through nip rolls 41 and 42 to sheeting equipment 43. The stack of finished sheets 45 obtained from equipment 43 is ready for use if the core-forming material 39 is fully cured. If not, the stack 45 can be kept in either a room temperature or elevated temperature environment until the curing is complete.

In the description which follows and throughout this disclosure, it should be borne in mind that the measurement of elastic or flexural modulus for a composite of two skins and a microsphere-filled core involves some simplifying assumptions. When taking such measurements, I have assumed that the composites of this invention behave as sheets of homogeneous material. I have found that, provided the loading of microspheres is not greater than 65 percent by volume, this assumption is a reasonable approximation. When the loading of microspheres is greater than 65 volume percent, voids and/or sphere-to-sphere contacts are created in the matrix, resulting in behavior which is not at all characteristic of a homogeneous material. When using Bruel-Kjaer type 3930 complex modulus apparatus or any equivalent device, the experimental error in modulus determinations can be large; so all modulus values given in this application are approximate, regardless of the nature of the material.

The impact strength of the composites of this invention was determined at room temperature (25° C.) and −10° F. (−23° C.) using a Gardner IG-1120 Heavy Duty Impact Tester, having a 0.625 inch ball and a 0.640 inch diameter die. The density of skin/filled core/skin sandwich laminate made according to this invention ranges from 0.5 g./cm.$^3$ to 1.0 g./cm.$^3$, the preferred range being 0.65 g./cm.$^3$ to 0.9 g./cm.$^3$. I have also found that ratio of the impact strength to the specific gravity of the composites of this invention is as high or higher than most impact resistant plastic materials.

In addition to measuring composite modulus and impact resistance, composites made according to this invention were bent at a sharp angle to determine resistance to buckling and cut with simple cutting tools to determine ease of cutting.

Although the thickness of the composites made according to this invention may range from 25 to 250 mils (about 0.6 mm. to about 6 mm.), the approximate preferred thickness range is 50 to 125 mils (1.25 to 3 mm.). When the overall thickness of the composite is near the lower end of the desired range, i.e. near 25 mils, thicker skins will aid in preserving the structural strength of the composite. For overall thicknesses near the upper end of the range, i.e. near 250 mils, thicker skins are also desirable so that the properties of the core material do not overshadow the highly desirable properties of the skins. In short, various skin and core thicknesses (described hereinafter) can be used in fabricating the composite, but, in any event, the core thickness/skin thickness ratio ("skin thickness" being the thickness of a single skin) should be considerably less than 500:1. This ratio can be less than 2, but, in this event, the rather thick skins required to achieve such a ratio are, as pointed out earlier, somewhat inconvenient to manufacture. For practicality, I prefer a core/skin ratio of at least 3:1. For high strength properties, I prefer a core/skin ratio of less than 250:1.

The preferred range of flexural modulus for the composite is approximately $1-3 \times 10^5$ psi (about $0.7-2 \times 10^{10}$ dynes/cm.$^2$), as determined at room temperature with a Bruel-Kjaer type 3930 complex modulus apparatus. Many factors affect this composite modulus, but in any event sandwich-type laminates within the desired composite flexural modulus range can be made by using the core materials, skins, and filler loadings preferred according to this invention.

It should be borne in mid, in the following detailed description of the components of the composite, that, although a skin/filled core/skin structure is preferred (herein referred to as a sandwich-type laminate), laminates having more than three layers are within the scope of this invention. For example: a skin/filled core/skin/filled core/skin laminate would be useful as a construction material where somewhat less flexibility is desirable. Furthermore, in any laminate made according to this invention, it is generally desirable to have a decorative layer or surface on at least one, preferably more than one, of the skins. (Particularly in "sandwich" laminates, improved durability can be obtained by coating both skins.) Other laminated structures will be obvious to those skilled in the art.

I have found that sandwich-type (skin/filled core/skin) laminated sheets made according to this invention have excellent impact strength, excellent resistance to buckling, wrinkling, breaking, or creasing when severely bent (e.g. when a small sheet is bent into the shape of a cylinder such that the opposite edges actually touch each other) and are easily cut with simple cutting tools such as an ordinary household scissors. The impact strength at room temperature of, for example, typical sandwich-type laminated sheets of 50 to 60 mils thickness is at least 25 in.-lb. (29 cm.-kg.) and can be as high as 80 in.-lb. (92 cm.-kg.). The impact strength of these typical laminates at $-10°$ F. ($-23°$ C.) ranges from 10 in.-lb. (12 cm.-kg.) to as high as 35 in.-lb. (40 cm.-kg.).

The following is a description of the components of the laminates made according to this invention:

I. Skin Material

It has already been pointed out that 1 to 10 mil thick oriented polyester films are suitable for use in this invention. The preferred polyester is poly(ethylene terephthalate). The preferred thickness is 2 to 5 mils (0.05 to 0.125 mm.). One mil biaxially oriented polyester films have a stress (at the yield point) at 2 percent elongation which is on the order of 10,000 psi (700 kg./cm.$^2$). Films formed from other polymers, such as polycarbonate, polyvinyl chloride, polyvinyl fluoride, polyurethanes, and the like, can be used, provided that the thickness of these films is in the 1 to 10 mils range and is also sufficient to obtain an equivalent stress at 2.0 percent elongation. Likewise, aluminum foil can be used at a thickness within the 1 to 10 mil range that will meet the stress requirement of this invention. A difficulty with aluminum is its tendency toward corrosion in salt-spray environments, as pointed out earlier. A difficulty of polyvinyl chloride is the relatively poor low temperature performance as compared to poly(ethylene terephthalate). Generally speaking, polymers other than the oriented polyesters do not perform quite as well as these polyesters, and are less preferred for use in this invention.

The term "polyester," as used in the description of this invention, is intended to include polymers prepared from difunctional alcohols and difunctional carboxylic acids (or esters thereof). The preferred difunctional alcohols are the alkylene glycols such as ethylene glycol, propylene glycol, and the like. Another preferred glycol is 1,4-cyclohexanedimethanol. The polymerization of the polyesters useful in this invention is carried out according to prior art procedures involving ester interchange reactions. Thus, the difunctional carboxylic acids used in the preparation of polyesters suitable for this invention will be employed in the form of esters, e.g. dimethyl esters. The preferred dimethyl esters are derived from arylene dicarboxylic acids such as terephthalic acid, isophthalic acid, and mixtures thereof. As noted earlier, especially good strength characteristics are provided by poly(ethylene terephthalate). The flexural modulus of this polymer is ideally suited to this invention and is normally in the range of $5-6 \times 10^5$ psi ($3.5-4.1 \times 10^{10}$ dynes/cm.$^2$). A number of the preferred polyesters are commercially available from U.S. corporations under the following registered trademarks: "Mylar" (E. I. Dupont & Co.) or "Scotchpar" (3M Co.), which are both biaxially oriented poly(ethylene terephthalate), "Videne," a polyester derived from ethylene glycol and the esters of isophthalic and terephthalic acids; and "Kodar" (Eastman Kodak Co.), a polyester derived from 1,4-cyclohexane dimethanol and the esters of isophthalic and terephthalic acid.

II. Low Density (Hollow, Particulate) Filler

The preferred filler for use in this invention comprises a plurality of hollow glass spheres 5 to 750 microns in diameter such as those described in U.S. Pat. No. 3,030,215, characterized as being hollow, discrete spheres of synthetic, fused water-insoluble alkali metal silicate-based glass, the spheres having solid walls of approximately uniform density and a thickness of 0.5 to 10 percent of their diameters. An especially good type of glass microsphere filler is described in U.S. Pat. No. 3,365,315, issued Jan. 23, 1968. These microspheres are bubbles having a diameter between 5 and 300 microns, an average true particle density between 0.05 and 1.2, and a composition including at least 40 weight percent SiO$_2$ with at least 5 weight percent alkali metal oxide, and at least 5 weight percent up to approximately 50 weight percent of at least one other constituent selected from those conventionally present as optional ingredients in glasses requiring an initial glass forming temperature of melting between about 1,200° C and 1,500° C. These bubbles are obtained from particles of solid glass, e.g., glass cullet, by a reheating process which expands the solid particles and converts them to the bubble state. Natural products such as Pearlite and blown clay or organic microspheres derived from phenolic resins can also be used. As pointed out previously, the loading of microspheres should be no greater than 65 volume percent, and loadings as low as 20 percent significantly reduce the density of the composite. The preferred range of microsphere loadings is 40 to 60 volume percent. The density of the microspheres can vary from 0.1 g./cm.$^3$ to 0.6 g./cm.$^3$; however, densities of 0.1 to 0.4 g./cm.$^3$ are preferred. The approximate preferred size range of the microspheres is 20 to 100 microns. The glass microspheres can be coated with any suitable primer.

III. Core Polymer

The polymer used in the core of composites made according to this invention should be elastomeric. By "elastomeric" is meant synthetic polymer with rubber-like characteristics, particularly a polymeric material which can be elongated at least 100 percent and can then return to substantially its original shape. I have found that elastomers with approximate range of stress at 100 percent elongation of 500 to 4,000 psi (35 to 280 kg./cm.$^2$) are suitable for use in this invention. The preferred range of stress is 750–3,000 psi (50–210 kg./cm.$^2$). Various elastomeric materials besides polyurethanes will meet the requirements of the invention including synthetic rubbers such as the polyacrylates, the butadiene polymers (butadiene-styrene, butadiene-acrylonitrile, butadiene-acrylic acid and butadiene homopolymers), polyisoprenes, polysulfides, silicones, ethylenepropylene copolymers, polychloroprene, etc. For ease of application, I prefer in situ curable elastomers, the most suitable from this standpoint being the polyurethanes (including polyurethane-polyureas), i.e. polymers containing monomeric units linked by —NH—CO—X— units, wherein X is oxygen, NH, N-alkyl, sulfur, etc., i.e. monomeric units derived from isocyanates and active-hydrogen containing compounds such as polyols, polymercaptans and/or polyfunctional amines. The best performance is obtained from the polyetherurethanes, although polyesterurethanes can be used. Generally speaking, the elastomeric character of the polyurethane is determined by the nature and amounts of reactants from which it is derived, e.g. by the length of the polyether or polyester chain of the polyol and the degree of crosslinking, linear polyurethanes being more elastomeric than the crosslinked type. Thus, the isocyanates and active hydrogen-containing compounds used in making polyurethanes for cores of this invention are preferably difunctional, i.e. diisocyanates, diols, diamines, dimercaptans, etc. The term "active hydrogen" is defined herein according to the test devised by Zerwitinoff, J.A.C.S. 49 3181 (1927). The use of functionality greater than two, e.g. triols or triamines is permissable, provided the crosslink density of the resulting polymer does not substantially exceed one crosslink per 3,000 polymer atomic weight units (as theoretically determined by the various numbers of equivalents of polyfunctional material making up the polymer). The preferred diols (i.e. glycols) should be selected so that at least part of the ultimately obtained polyurethane molecule will contain enough oxyalkylene or ester units to give the desired elastomeric properties. Examples of suitable glycols are polyoxyalkylene glycols such as tetramethylene glycol, polyoxypropylene glycol, polyoxybutylene glycol, and mixtures thereof. At least one of the glycols used to make the polyurethane should be in the approximate molecular weight range of 400–3,000. If proper consideration is given to the crosslink density and to the selection of polyols, isocyanates, and polyamines, an elastomer can be provided which will elongate several hundred percent, at least 100 percent, and, at 100 percent elongation, will have a stress of 500–4,000 psi.

The most suitable isocyanates are diisocyanates such as the arylene diisocyanates, i.e. OCN—Ar—NCO, wherein Ar is a mono- or polycyclic aromatic nucleus such as a benzene, toluene, xylene, or naphthalene nucleus. A particularly suitable arylene diisocyanate is toluene diisocyanate (hereinafter TDI), especially the 2,4 and/or 2,6-isomers, though any TDI isomer is operative.

Isocyanate-terminated prepolymers provide suitable elastomeric polyurethanes when the aforementioned polyfunctional amines (preferably diamines) are used as chain-extenders. Some chain extending agents produce foamed or cellular polyurethanes; these are not preferred for use with this invention. The preferred chain-extending agents for use in the polyurethanes of this invention are low molecular glycols or other active-hydrogen containing compounds, and diamines of the type $H_2N$—aryl—$NH_2$, wherein the aryl group can be:

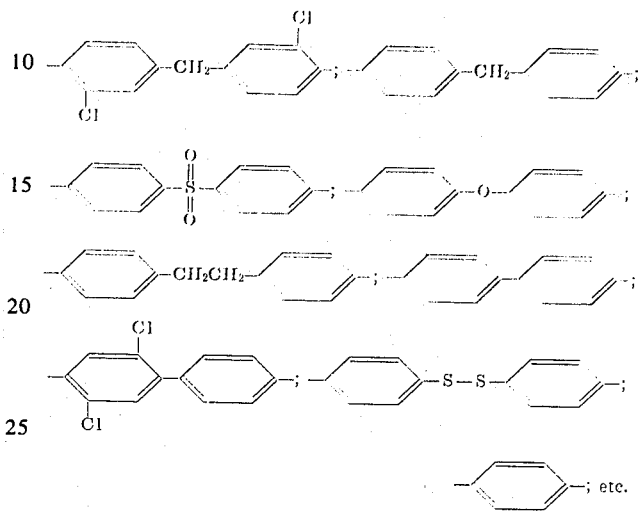

The first-listed diamine is particularly suitable: 4,4-methylene-bis-(o-chloroaniline), hereinafter designated 4,4'-M-b(o-CA).

Any suitable catalyst for accelerating the formation of polyurethanes from the above-described reactants can be used, e.g. lead octoate, stannous octoate, diphenyl mercury, mercuric acetate, etc. If such catalysts are not used, the polyurethane can still be formed by heating an isocyanate-terminated prepolymer well above room temperature, e.g. to 65° C. or higher, and then adding the molten diamine. This and other polymerization methods will be described in greater detail hereinafter.

In making a polyurethane matrix suitable for use as the core elastomer of this invention, the above-mentioned glycols and the above-mentioned diamines are used in the range of 10/90 to 90/10 mole percent to give the desired matrix properties. The preferred composition, however, contains greater mole percent of the polyol to insure adequate low temperature performance as well as proper rigidity at ambient temperatures. The low density (hollow, particulate) filler described previously can be added to a monomeric and/or prepolymer component used in the formation of the polymeric matrix.

The isocyanate component can be used per se or prepolymerized with a glycol, i.e.:

A. The polyurethane elastomer composition can be prepared using a polyisocyanate, e.g. 80/20. or 65/35 2,4-; 2,6- toluene diisocyanate in conjunction with a polyamine and/or polyol solution and, preferably, a catalyst in the so-called "one-shot" technique, a commonly used NCO/active hydrogen polymerization method. The 37 A" component is composed of the polyamine/polyol solution, glass bubbles, and catalyst and is mixed with the "B" (diisocyanate) component immediately prior to casting the finished product. The resulting polyurethane-microsphere composition is castable for a period of time and can be coated between two films. This technique lends itself to continuous manufacturing processes and provides elastomers with, inter alia, good resistance to low temperature shock.

B. Prepolymers containing unreacted —NCO groups can be chain-extended with a diamine or other polyfunctional active hydrogen containing compounds or mixture of compounds. Particularly useful prepolymers are those having at least one unit of the formula OCN—R—NH—CO—Z—CO—NH—R—NCO, wherein R is arylene (e.g. a toluene nucleus), alkylene or the like and Z is derived from a polyester or polyether polyol or the like. These prepolymers can have an approximate molecular weight range of 400 to 2,000 for this purpose, although the preferential prepolymers lie in the 400 to 1,400 molecular weight range. Urethanes prepared from polyethers are preferred in that they show superior resistance to low temperature shock as compared to core elastomers prepared from the polyester prepolymers. Prepolymers can be utilized as follows:

The microspheres are added to the prepolymer at an elevated temperature, e.g. 65° C. or higher. A molten diamine chain-extending agent is added, and the solution is mixed and coated as in the "one-shot" technique. A catalyst is not necessary in this method. A modification of this prepolymer technique is the semi-prepolymer method, wherein the prepolymer component is formed from a diol and a stoichiometric excess of diisocyanate. A second component comprises a diamine, some diol (which is a solvent for the diamine), and a catalyst. Microspheres are stirred into either or both components, and the two components are then mixed in proper ratios and coated as in the previously described techniques. Further modifications involve an isocyanate component comprising a mixture of prepolymer and arylene diisocyanates, etc.

The "one-shot" method is preferred. In all methods, the amount of glass bubbles added prior to complete polymerization is selected such that the bubble loading of the core material will be 20–65 volume percent.

IV. Lamination of Core and Skins

The preferred method of lamination is a continuous operation. In this continuous lamination process, the film used to form the skins of the laminate of this invention are primed or etched to provide good bonding with the elastomeric core material. An example of an etchant suitable for use with polyester skins is p-chlorophenol dissolved in an organic solvent such as a low-boiling ketone. The etching is carried out using coating and evaporating techniques well known in the art. On the side opposite to the etched side of the film, a decorative coating can be applied using normal coating techniques. Typically, a vinyl-polyester resin blend is dissolved in an organic solvent such as a haloalkane for use as the decorative coating. A pigment such as titanium dioxide can be added to this coating composition.

The continuous lamination arrangement described in FIG. 3 is se up by threading two films through a coating head and oven to a nip roll drive, consisting of two rolls, as in FIG. 3. The coating head, made up, for example, of two steel orificing rolls, can be set a given distance apart to determine the thickness of the composite product. Margins are set up on both sides to retain the bubble-filled liquid along the edges of the film.

The microsphere-filled curable mixture, regardless of whether it comprises a "one-shot" or a prepolymer/chain extender mixture, can be low enough in viscosity to be supplied continuously to the coating head at the orifice between the rolls using any suitable two-component metering and mixing machine. This results in the desired structure; a sandwich of two films and a core. The microsphere-filled core is still liquid, but a brief exposure to a heated oven is enough to partially cure the sandwich to a semi-rigid product which can be sheeted and stacked.

The following Examples further illustrate the principle and practice of this invention. In these Examples, and throughout this application, the terms "microspheres" and "bubbles" are used interchangeably.

EXAMPLE 1

Two biaxially oriented poly(ethylene terephthalate) films 2 mils (0.05 mm.) in thickness were coated with a pigmented coating to provide a weather-resistant, decorative surface. The coating formula was:

|  | Wt. Percent |
| --- | --- |
| 1,1,2-trichloroethane | 79 |
| "Vinylite VAGH" (vinyl acetate-vinyl chloride co-polymer obtainable from Union Carbide) | 7 |
| Polyester resin (derived from 50:50 dimethyl isophthalate/dimethylterephthalate and ethylene glycol) | 7 |
| Titanium dioxide | 7 |

This coating was cast on the polyester film using a conventional roll coater, 5 grains per 24 in.$^2$ (0.2 gm./100 cm.$^2$) dry weight. The coating was dried in an oven for 5 minutes at 90° C. Each 2 mil film having been coated as described above, the opposite sides of the film were then etched with a minute amount of p-chlorophenol coated from a 12 percent solids solution in methyl ethyl ketone. The residue was evaporated in an oven set at 90° C. for 5 minutes. The two films were then ready for use in the process described in FIG. 3; thus, they were threaded through orificing rolls 35 and 36 and oven 40 to nip roll drive (rolls 41 and 42) to provide the continuous lamination arrangement described in FIG. 3. The microsphere-filled, curable mixture 39 which was supplied continuously to the space between the orificing rolls 35 and 36 was a plastic mass composed of:

| Component: | Amount |
| --- | --- |
| 65/35 2,4-; 2,6-TDI (toluene diisocyanate) | 2 equivalents. |
| 1,000 molecular weight polyoxybutylene glycol | 1 equivalent. |
| 4,4'-methylene bis-(o-chloroaniline), for convenience hereinafter designated 4,4'-M-b(o-CA). | 1 equivalent. |
| Stannous octoate | 0.25 wt. percent. |
| Glass microspheres (.30 g./cc. glass bubbles, described in U.S. Patent 3,365,315). | 50% by volume. |

Oven 40 was heated to 100° C., hot enough to partially cure the continuously formed laminate to a semi-rigid product. The plastic mass described above formed a castable matrix when prepared in accordance with the "one-shot" method described previously. The sandwich of microsphere-filled matrix and polyester skins was laminated as shown in FIG. 3 by simultaneously passing the two films over rolls 35 and 36 with the castable matrix squeezed between the films, thus contacting the etched sides of the films. The resulting sandwich-type laminate was sheeted out by equipment 43 to form stack 45 and then cured for 150 hours at room temperature. The density of the resulting laminated sheet was 0.7 g./cc. The impact strength of the sheet at room temperature was 60 in.-lb. and at −10° F. (−23° C.) was 30 in.-lb. The flexural modulus of the composite was $2.0 \times 10^5$ psi ($1.4 \times 10^{10}$ dynes/cm.$^2$). The sheet could easily be cut with an ordinary household scissors. A 20 cm. × 20 cm. sample was cut from the sheet and bent into the shape of a cylinder such that the two 20 cm. sides touched. No buckling was observed.

EXAMPLE 2

Two biaxially-oriented poly(ethylene terephthalate) films were prepared as in Example 1. The microsphere-filled mixture 39 was supplied continuously from equipment 37 as in Example 1, but was prepared differently, as follows:

1. a high viscosity isocyanate-terminated prepolymer was prepared from 2 equivalents of 65/35 2,4-; 2,6- TDI and one equivalent of 1,000 molecular weight polyoxybutylene glycol;
2. the prepolymer was maintained at a temperature of 65° C. and the 0.30 g./cc. glass microspheres were added to the prepolymer until the resulting prepolymer/glass bubble mass was 50 volume percent glass bubbles;
3. molten 4,4'-M-b(o-CA) was added and the resulting mixture was agitated in equipment 37 and supplied continuously therefrom to the space defined by the orificing rolls 35 and 36.

The skilled technician will readily appreciate that steps (1) and (2) are not always necessary because several isocyanate-terminated prepolymers can be obtained pre-reacted from various suppliers.

The lamination process was once again as described in FIG. 3. No catalyst was needed to complete the cure (chain extension of the prepolymer) of the sheeted product 45. The cured laminate had substantially the same properties as that of Example 1, but the high viscosity of the microsphere-filled mixture 39 made it less convenient to handle from a manufacturing standpoint when compared to the "one-shot" mixture of Example 1.

EXAMPLE 3

Example 2 was run again except that solid 4,4'-M-b(o-CA) was dissolved in warm polyoxybutylene glycol and then added to the prepolymer. The dissolved diamine was found to be more convenient to handle than a molten material.

EXAMPLE 4

The procedure of Example 2 was followed except that the diol used was one equivalent of polyoxypropylene glycol of molecular weight 1,000. The room temperature properties of the resulting laminate were almost the same as those of the Example 1 or 2 laminate.

However, when a prepolymer derived from one equivalent of 2,000 molecular weight polyoxypropylene glycol was substituted in this procedure, the resistance of the resulting laminate to buckling, though adequate for many uses, was markedly inferior, particularly compared to the laminates of Examples 1–3.

EXAMPLE 5

Three sample laminates of varying core compositions and skin thicknesses were made according to the method of Example 3. The polyurethane core formulations were as follows:

| No. of equivalents in Sample | 1 | 2 and 3 |
|---|---|---|
| (A) Prepolymers: | | |
| (1) TDI plus 1,000 MW polyoxybutylene glycol | 4 | |
| (2) TDI plus prepolymer of 650–700 MW polyoxybutylene glycol | | 7 |
| (B) Diamine chain-extender and diol (solvent for di.-amine): | | |
| (1) 4,4'-M-b(o-CA) (diamine) | 3 | 6 |
| (2) Polyoxypropylene glycol 1,000 MW (solvent) | 1 | |
| (3) Polyoxybutylene glycol, 670 MW (solvent) | | 1 |

The polyurethane properties were as follows:

| Sample | Stress at 100% elongation in p.s.i. (kg./cm.²) | Elongation at break, percent | Tensile strength in p.s.i. (kg./cm.²) |
|---|---|---|---|
| 1 | 1,145 (80) | 575 | 5,000 (350) |
| 2 and 3 | 3,890 (270) | 230 | 7,580 (530) |

The composites (laminates) contained 50 volume percent glass microspheres in their cores and had polyester skins as in Examples 1–4. A full description of the laminates follows:

| Sample | Overall thickness | Skin thickness | Core/skin ratio | Modulus in p.s.i. (kg./cm.²) |
|---|---|---|---|---|
| 1 | 200 mils (5 mm.) | 4 mils (.1 mm.) | 48:1 | 1.25×10⁵ (8.8×10³) |
| 2 | 200 mils (5 mm.) | 7.5 mils (.2 mm.) | 24.7:1 | 1.75×10⁵ (1.2×10⁴) |
| 3 | 50 mils (1.2 mm.) | 7.5 mils (.2 mm.) | 4.7:1 | 4.0×10⁵ (2.8×10⁴) |

EXAMPLE 6

For the sake of comparison, a laminate was made according to Example 5, but with a rigid core. The core material contained 30 volume percent microbubbles and was made from a TDI-castor oil urethane polymer extended and crosslinked with polyoxypropylene triol to provide a polyurethane having a crosslink density well over one crosslink per 3,000 molecular weight. The crosslinked polymer was non-elastomeric in that it would not elongate even as much as 100 percent. Polyester skins 2 mils (0.05 mm.) in thickness were used in forming the laminate, which had an overall thickness of 53 mils (1.35 mm. and a specific gravity of 0.8. The impact strength of the laminate was very poor, being less than 5 inch-pounds (<6 cm.-Kg.) at room temperature.

EXAMPLE 7

A series of sample sandwich laminates were made up to test the impact strength of laminates made from 30 volume percent bubble core at room temperature and at −10° F. C−23° C.). Batch processes were used, i.e. the primed films were coated by hand with core material containing 50 volume % 0.30 g./cc. glass bubbles. Polyurethane core-forming materials were made from reaction mixtures composed of:

A. 78–85 Wt. % of a diisocyanate prepolymer made from TDI and a glycol, the glycol being
I. 2,000 molecular weight tetramethylene glycol,
II. 1,000 molecular weight tetramethylene glycol,
III. 1,000 molecular weight polyoxypropylene glycol, or
IV. 2,000 molecular weight polyoxypropylene glycol B. A diamine/diol component consisting of 4,4'-M-b(o-CA) dissolved in the diglycidyl ether of propylene glycol. This component formed the balance of the reaction mixture and contained equal amounts by weight of the 4,4'-M-b(o-CA) and the ether.

In the case of prepolymer A(I) (TDI + 2,000 NW tetramethylene glycol), 80 percent of the prepolymer was combined with the B component; in the case of prepolymers A(II) and A(III) 78 percent was used; with A(IV), 85 percent was used.

The skins used to make the sample laminates were, unless otherwise indicated, biaxially oriented poly(ethylene terephthalate) 2 or 4 mils (0.05 or 0.1 mm.) in thickness. The overall thickness of the samples ranged from 54 to 57 mils (1.37 to 1.45 mm.). Cores of all samples contained 50 percent (volume) microspheres and the polymers used in the cores (i.e. the unfilled polymer) had a stress at 100 percent elongation greater than 500 psi (35 kg./cm.²). Composite moduli of the samples were, in every case, within the range of 0.5–4 × 10⁵ psi (0.3–3 × 10¹⁰ dynes/cm.²).

| Prepolymer used to make core | Skin thickness (mils) | Overall thickness (mils) | Laminate spec. grav. | Impact strength (in.-lb.) Room temp. | Impact strength (in.-lb.) −10° F. |
|---|---|---|---|---|---|
| A (I) | 2 | 56 | .75 | 50 | 35 |
| A (II) | 2 | 54 | .76 | 50 | 35 |
| A (II) | *2 | 58 | .70 | 35 | 20 |
| A (III) | 2 | 55 | .72 | 55 | 10 |
| A (III) | 4 | 57 | .72 | 90 | 10 |
| A (IV) | 2 | 55 | .76 | 40 | 30 |
| A (IV) | 4 | 54 | .76 | 80 | 80+ |

*Polyvinylfluoride skins; composite modulus about 1×10⁵ p.s.i.

An additional sample with an A(II) core, 4 mil extruded, non-plasticized polyvinylchloride skins, and a thickness of 70 mils had an impact resistance sufficient only for indoor (room temperature) uses, but had a good specific gravity (0.69), good crease-resistance properties, and a composite modulus of about 2 × 10⁵ psi.

EXAMPLE 8

A large laminated sheet (250 cm. × 125 cm.) made according to Example 3 was provided with a pigmented coating on both polyester skins, the pigmented coating being the TiO₂/polyester/vinyl composition described in Example 1. Letters 60 cm. high were easily printed onto one of the coated skins using silk-screen printing. The resulting sign was very attractive and could be easily mounted on the side of the trailer of a tractor-trailer vehicle by riveting the sign to the exterior posts on the trailer, which were spaced 60 cm. apart. The sign weighed only 3.3 kg. (7.3 lb.) and was much lighter than a plywood or aluminum sign of comparable strength The foregoing description is illustrative of this invention, but many modifications of the disclosed continuous and batch processes and the resulting laminates are possible. For example, a small amount of foaming of the laminate core layer or layers can be tolerated, provided the polymer of these layers still has the required elastomeric properties. Further modifications or substitutions relating to the skin and core materials are also possible. For example, the skin material could be fabricated from other synthetic organic polymers, including polyamides, polyolefins (such as polyethylene and/or polypropylene), or other high tensile, film-forming polymers. Although the description has been directed primarily toward sandwich-type laminates useful as signs or sign backings, many other decorative, constructional, and insulative applications are possible, including uses in walls, flooring, ceilings, auto or airplane bodies, container manufacture, etc. The true scope of the invention is to be determined from the claims which follow.

What is claimed is:

1. A semi-rigid, impact-resistant laminate having resistance to buckling when bent and capable of being bent at room temperature, said laminate comprising a sandwich, said sandwich comprising:

a core comprising an elastomeric polyurethane polymer containing 20–65 percent, by volume, of a filler comprising hollow particles having a density of 0.1–0.6 g./cm.$^3$, said elastomeric polyurethane polymer having a stress modulus at 100 percent elongation of 500–4,000 psi, at least two skins of entirely metal or polymeric material, separated by said core and adhered thereto, each skin having a thickness of 1–10 mils and a stress at 2 percent elongation of at least about 10,000 psi, said sandwich having a composite flexural modulus of about 0.5 to about $4 \times 10^5$ psi, a composite thickness of about 25 to about 250 mils, and a composite density of about 0.5 g./cm.$^3$ to about 1.0 g./cm.$^3$.

2. A laminate according to claim 1 wherein said skins consist essentially of a material selected from the group consisting of: aluminum foil and a synthetic polyester.

3. A laminate according to claim 2 wherein the repeating ester units of said polyester are arylene dicarboxylic acid esters of a glycol selected from the group consisting of the alkylene glycols and 1,4-cyclohexane dimethanol.

4. A laminate according to claim 2 wherein each of said polyester skins is 2–5 mils in thickness, and said polyester is biaxially oriented.

5. A laminate according to claim 1 wherein said polyurethane is a polyetherurethane containing oxyalkylene chains, said chains having a molecular weight ranging from 400 to 3,000, said polyurethane having a crosslink density less than one crosslink per 3,000 polymer atomic weight units.

6. A laminate according to claim 1 having an impact strength, at room temperature, of at least 30 inch-pounds, and, at $-23°$ C., of at least 10 inch-pounds.

7. A laminate according to claim 1 having a decorative coating on at least one of said skins.

8. A laminate according to claim 1 consisting of a single core and two skins with the properties of said sandwich.

9. A laminate according to claim 1 wherein said filler comprises hollow glass microspheres 0.1–0.4 g./cm.$^3$ in density and 5–300 microns in size, said filler being 40–60 volume % of said core.

10. A laminate according to claim 1 wherein said core is at least 3 times but less than 250 times the thickness of each of said skins.

11. A semi-rigid, impact-resistant, buckling-resistant, sheet-like laminate comprising:

1. at least one core comprising (i) a polyurethane elastomer having a stress modulus at 100 percent elongation of 750–3,000 psi, and (ii) 40–60 volume % of a filler in said core comprising a plurality of hollow glass microspheres 0.1–0.4 g./cm.$^3$ in density and 20–100 microns in size, and
   2. At least two skins separated by and bonded to said core, each skin comprising a biaxially oriented poly(ethylene terephthalate) film 2–5 mils in thickness; said laminate having a composite flexural modulus of $1.0–3.0 \times 10^5$ psi, a composite thickness of 50–125 mils, a composite density of 0.65–0.9 g./cm.$^3$, an impact strength, at 75° F., of at least 30 in.-lbs., and, at $-23°$ C., of at least 10 in.-lbs. and having substantially no tendency to break or buckle when a sheet of said laminate is bent, at room temperature, into the shape of a cylinder.

12. A sign backing comprising the laminate of claim 1 with indicia means displayed thereon.

13. A sign backing according to claim 12 mounted on supporting members spaced up to 36 inches apart.

14. A sign backing comprising the laminate of claim 11 with indicia means displayed thereon, said sign backing being mounted on supporting members spaced up to 36 inches apart.

* * * * *